(12) United States Patent
Psarras et al.

(10) Patent No.: US 6,453,035 B1
(45) Date of Patent: Sep. 17, 2002

(54) METHOD AND APPARATUS FOR PROVIDING VIRTUAL PRIVATE NETWORK SERVICES OVER PUBLIC SWITCHED TELEPHONE NETWORK

(75) Inventors: Elias Psarras, Ottawa; R. William Carkner, Kanata; Marc Cotton, Aylaaer, all of (CA)

(73) Assignee: Stentor Resource Centre Inc. (CA)

( * ) Notice: Subject to any disclaimer, the term of this patent is extended or adjusted under 35 U.S.C. 154(b) by 0 days.

(21) Appl. No.: 09/033,278

(22) Filed: Mar. 2, 1998

(51) Int. Cl.[7] .............................................. H04M 7/00
(52) U.S. Cl. ...................... 379/221.08; 379/220.01; 379/221.09; 379/221.12
(58) Field of Search .................. 379/207, 219, 379/220, 225, 229, 230, 231, 234, 221.08, 207.11, 207.12, 207.02, 112.09, 221.09, 221.12

(56) References Cited

U.S. PATENT DOCUMENTS

| | | | |
|---|---|---|---|
| 4,348,554 A | 9/1982 | Asmuth | 179/18 B |
| 4,802,199 A | 1/1989 | Lange et al. | 379/221 |
| 4,982,421 A | 1/1991 | Kirsch et al. | 379/216 |
| 5,063,592 A | 11/1991 | Cannella et al. | 379/207 |
| 5,212,691 A | 5/1993 | Hokari | 370/110.1 |
| 5,247,571 A | 9/1993 | Kay et al. | 379/207 |
| 5,282,244 A | 1/1994 | Fuller et al. | 379/230 |
| 5,339,356 A | 8/1994 | Ishii | 379/234 |
| 5,357,564 A | 10/1994 | Gupta et al. | 379/188 |
| 5,422,940 A | 6/1995 | Endo et al. | 379/207 |
| 5,422,941 A | 6/1995 | Hasenauer et al. | 379/207 |
| 5,455,855 A | 10/1995 | Hokari | 379/229 |
| 5,487,110 A | 1/1996 | Bray et al. | 379/220 |
| 5,490,212 A | 2/1996 | Lautenschlager | 379/225 |
| 5,539,817 A | 7/1996 | Wilkes | 379/230 |
| 5,550,904 A | 8/1996 | Andruska et al. | 379/127 |
| 5,583,926 A | 12/1996 | Venier et al. | 379/207 |
| 5,602,909 A | 2/1997 | Carkner et al. | 379/207 |
| 5,757,894 A * | 5/1998 | Kay et al. | 379/127.03 |
| 5,809,121 A * | 9/1998 | Elliott et al. | 379/127 |
| 5,892,821 A * | 4/1999 | Turner | 379/221.08 |
| 5,917,899 A * | 6/1999 | Moss et al. | 379/221.08 |
| 6,141,409 A * | 10/2000 | Madoch et al. | 379/207.02 |
| 6,175,622 B1 * | 1/2001 | Chiniwala et al. | 379/221.09 |

OTHER PUBLICATIONS

"Evolution in Business Networking" Davis et al Business Services Portfolio; Telesis 1988 three; pp. 23–31.

* cited by examiner

*Primary Examiner*—Ahmad F. Matar
*Assistant Examiner*—Bing Bui
(74) *Attorney, Agent, or Firm*—Hayes Soloway P.C.

(57) ABSTRACT

A method of providing a Private Telephone Network over a Public Telephone Network is described. A Private Network is a telecommunications service which has controlled access, and is generally provided to customers having two or more geographic locations. A Private Network is provided by embedding originating customer site identification and a Private Network Routing Code into an Initial Address Message at the originating End Office associated with the originating customer site. This Initial Address Message is routed to a Service Switching Point by the Private Network Routing Code. At the Service Switching Point, reference is made to databases defining the members of the Private Network, and a destination End Office identification and a destination customer site identification associated with the destination customer site is embedded into the Initial Address Message. The Initial Address Message is then routed to the destination End Office Switch by a Public Network Routing Number associated with the destination End Office Switch. This will permit a Private Network to be provided over a Public Telephone Network, taking advantage of the inherent redundancy and reliability of the Public Telephone Network.

26 Claims, 8 Drawing Sheets

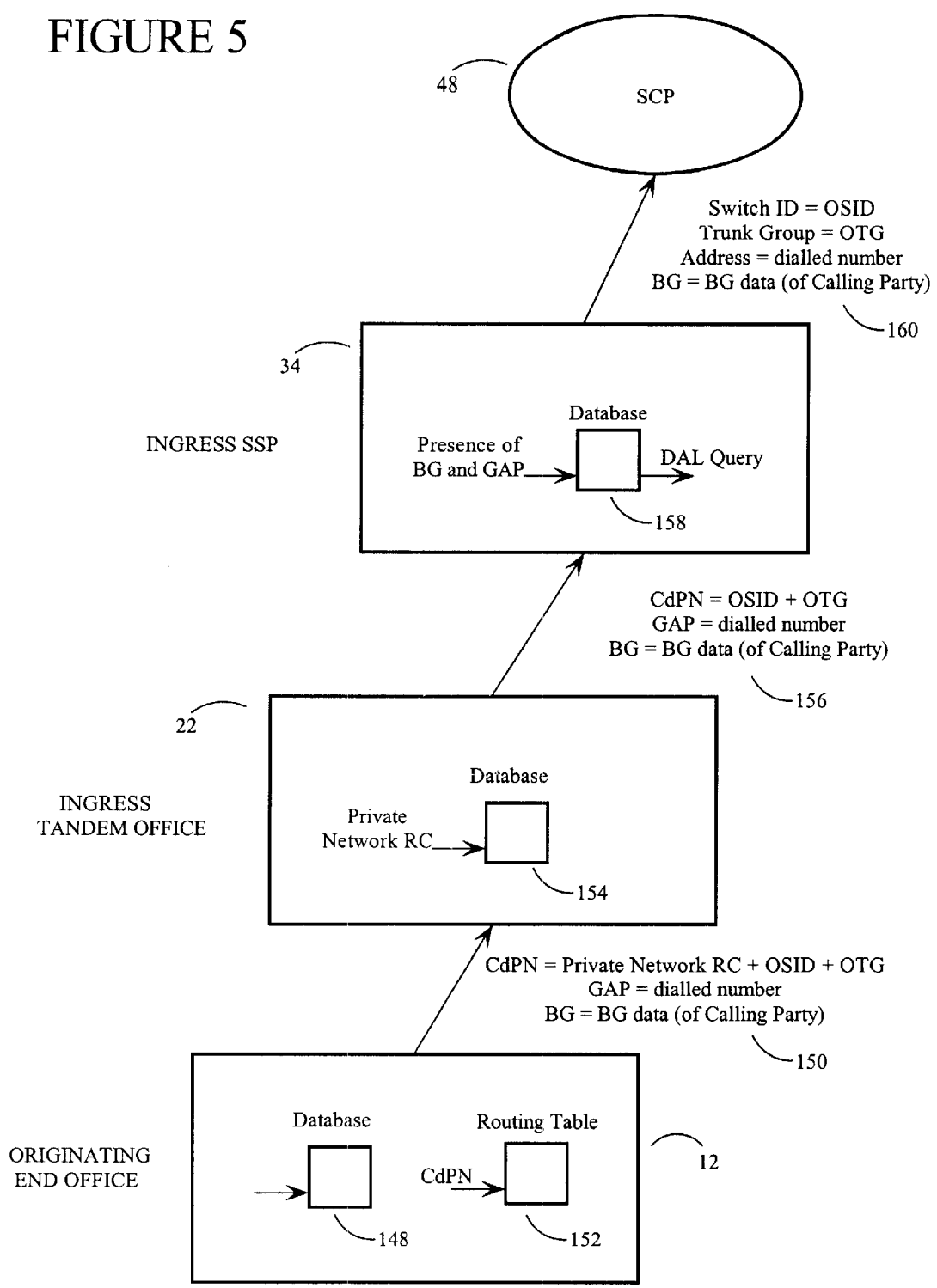

METHOD AND APPARATUS FOR PROVIDING VIRTUAL PRIVATE NETWORK SERVICES OVER PUBLIC SWITCHED TELEPHONE NETWORK

The present invention relates, generally, to telephone networks, and more specifically, to a method and an apparatus for providing Virtual Private Networks over the Public Switched Telephone Network.

BACKGROUND OF THE INVENTION

Virtual Private Networks (VPNs) provide multi-site organizations with an internal communication network, at a lower cost than placing equivalent long distance calls over the Public Switched Telephone Network (PSTN). Furthermore, additional services can be offered to such customers that are not available on the Public Switched Telephone Network, such as abbreviated private numbering plans and the ability to recognize an incoming call as being on-net. Typical organizations which demand such services are banks, real estate firms, health care systems, school systems and governmental agencies.

Currently, Virtual Private Network (VPN) services are provisioned with the use of Dedicated Access Lines (DALs) that connect the Customer's Premises Equipment (CPE) directly to a Service Switching Point (SSP) from a local End Office (EO). The CPE is hardwired to an EO, and there is a trunk, dedicated to that VPN customer, between the EO and the SSP. In many instances, such dedicated trunks may be hundreds of miles long. From the SSP, other SSPs can be accessed which have similar Dedicated Access Lines (DALs) connecting them to the other VPN sites in the customer's organization.

However, the cost of providing DALs to a customer is a relatively costly method of providing the VPN service. Because the End Office (EO) and associated Service Switching Point (SSP) may be hundreds of miles apart, the cost of installing and maintaining a physically dedicated trunk may be very great. This is in contrast to the Public Switched Telephone Network (PSTN) which uses long distance trunks far more efficiently by sharing the same trunks between a large number of users. As well, the routing of a long distance call over the PSTN may be flexible so that inoperative equipment or lines are avoided.

Given the potentially great physical lengths of the DALs and because they lack the redundancy of the PSTN, there is far greater potential for line failure. A customer would have to lease multiple DAL trunks to obtain reliability comparable to the PSTN, at a substantially greater cost than placing the same long distance calls via the PSTN.

It is known that the costs of offering VPN DAL services could be reduced with the use of a VPN service offered over the PSTN. This is illustrated in an article entitled "Evolution in Business Networks" BNR Telesis 1988 three. In the BNR article, a VPN is described where translations are performed from the private numbering plan to NANP format, at the respective Ingress and Egress End Offices. The biggest problem with this implementation is that any initial setup or change to a customer's VPN requires that each End Office be accessed and changed. Such a system requires that changes be made at all sites, possibly at great labour cost and downtime, and that the timing of changes be coordinated.

The fundamental problem with using the PSTN is that phone numbers can only be routed over the PSTN in the format of the North American Numbering Plan. Since VPNs generally use an abbreviated private numbering system and not the North American Numbering Plan, private number plans are not able to route a call through the PSTN.

A VPN may also be subject to regulatory requirements. These requirements may vary from location to location, but generally it is required that the VPN be secure, in that it operates as an isolated network from the PSTN, unless authorization is made otherwise. That is, means is required to prevent non-VPN callers from accidentally, or deliberately, placing calls into the VPN, and for VPN customers to dial outside the VPN. Furthermore, although the same physical trunks may carry both VPN and PSTN traffic, means is generally required to identify VPN calls as such.

Some attempts to address these problems that are known in the art, place great demands on the resources of the network. Any increased degree of transmission or handling within the telecommunications network, will tie up resources and increase the cost, and also increase the possibility of network failure. Clearly, a solution which places too great a demand on the network resources, will be no more reliable or cost effective than the existing DAL system.

Some of the proposals in the prior art require intelligence to be distributed about the telecommunications network, for example, in End Offices, Tandem Office or Service Switching Points. Having intelligence distributed among a number of databases requires that changes be made at all pertinent locations, and that the timing of changes be coordinated.

U.S. Pat. No. 5,550,904 discloses a VPN service that may be provided via the PSTN, but does not allow for a private numbering system. This system can only be implemented if the dialled telephone numbers are in fact NANP numbers which are understood by the PSTN, and both the Ingress and terminating sites have NANP numbers associated with them which are recognized by the PSTN. Essentially, U.S. Pat. No. 5,550,904 provides a means for screening PSTN calls when they arrive at the Egress End Office. It does not address a private numbering plan, and requires intelligence to be added to the Ingress and Egress End Offices.

U.S. Pat. No. 5,490,212 discloses a VPN provided over the PSTN, by accessing databases at the Ingress and Egress End Offices (EOs) to translate a private numbering plan to NANP and back again. This reference does not provide instruction on how to implement this new database. If each EO is provided with a separate database, setting up or modifying a large number of databases would have the labour and coordination problems noted above. In order to use a single central database, a new communication network would be required to connect all the EOs to this central database.

Area Wide Centrex systems have attempted to address similar problems to Virtual Private Networks (VPNs). Area Wide Centrex is the offering of service features to a business group which may be spread over a broad area, and connected to multiple End Offices, by moving the intelligence out of the End Offices and into a central point. Similarly, VPNs offer a specific group of service features to a business group which may be spread over a broad area, and connected to multiple End Offices, and may be implemented with centralized intelligence. The problems with using Centrex methods to implement a VPN, are outlined below.

U.S. Pat. No. 5,422,941 discloses a Centrex dialling system, based on a central database, in which the Ingress End Office (EO) creates a composite number, and forwards a query to the central database. The call is forwarded to a central database which translates the call into NANP format, and returns the call to the Originating EO. By returning the call to the Originating EO, greater demand is being placed on the network resources. As well, no direction is given regarding how this method could be implemented with the controlled access necessary for a VPN. Because the Called Party is being accessed with a NANP number, the VPN can be accessed by dialling the NANP number.

U.S. Pat. No. 5,583,926 also discloses a Centrex system, with a central database to translate dialled numbers from a Virtual Public Dialling Plan to a North American Numbering Plan. This system also requires that the call be forwarded to a central database which translates the call into NANP format and returns the call to the Originating EO, and gives no direction regarding how this method could be implemented with the controlled access necessary for a VPN.

A need therefore exists for providing a method and system able to provide a VPN DAL service via the PSTN, that fulfills the objects of the invention. The prior art discloses a number of proposals, but none are able to implement a VPN over the PSTN, exploiting its lower cost and increased reliability.

SUMMARY OF THE INVENTION

It is therefore an object of the invention to provide a Virtual Private Network on the Public Telephone Network.

One aspect of the invention is broadly defined as a method of providing a Private Network on a Public Network for customers having two or more sites, each site having a unique customer site identification and being associated with an End Office Switch of the Public Network having at least one Service Switching Point adapted to route Private Network calls, the Service Switching Point responsive to an Initial Address Message originating from one of the customer sites and destined for another of the customer sites, comprising the steps of: embedding originating customer site identification and a Private Network Routing Code into an Initial Address Message at the originating End Office associated with the originating customer site; routing the Initial Address Message to the Service Switching Point; embedding a destination End Office identification and a destination customer site identification associated with the destination customer site into the Initial Address Message; and routing the Initial Address Message to the destination End Office Switch associated with the destination customer site.

Another aspect of the invention is broadly defined as a system for providing a Private Network on a Public Network for customers having two or more sites, each site having a unique customer site identification and being associated with an End Office Switch of the Public Network having at least one Service Switching Point accessible from the End Offices for processing of Initial Address Messages originating from one of the customer sites, the system comprising: each End Office Switch associated with the Private Network customer site being responsive to a call from a Private Network customer site by: embedding an originating customer site identification and a Private Network Routing Code into an Initial Address Message at the originating End Office associated with the originating customer site; and routing the Initial Address Message to the Service Switching Point; the at least one Service Switching Point being adapted to route Private Network calls by being responsive to Private Network information embedded in the Initial Address Message by: embedding a destination End Office identification and a destination customer site identification associated with the destination customer site into the Initial Address Message; and routing the Initial Address Message to the destination End Office Switch associated with the destination customer site.

BRIEF DESCRIPTION OF THE DRAWINGS

These and other features of the invention will become more apparent from the following description in which reference is made to the appended drawings in which:

FIG. 5 is a flow diagram identifying the databases used within the signalling points, and the data transferred between the signalling points in the network, during ingress to the Service Control Point, in an embodiment of the invention.

DETAILED DESCRIPTION OF PREFERRED EMBODIMENTS OF THE INVENTION

A summary of the acronyms used herein is as follows:

| | |
|---|---|
| BG: | Business Group; |
| BGid: | Business Group Identification; |
| CCS7: | Common Channel Signalling 7; |
| CdPN: | Called Party Number; |
| CgPN: | Calling Party Number; |
| DAL: | Dedicated Access Line; |
| DMS: | Digital Multiplex System; |
| DTO: | Direct Termination Overflow; |
| EO: | End Office; |
| EO DAL: | EO Dedicated Access Line; |
| GAP: | Generic Address Parameter; |
| IAM: | Initial Address Message; |
| IDDD: | International Direct Distance Dialling; |
| ISDN: | Integrated Services Digital Network; |
| ISUP: | ISDN User Part; |
| LP: | Line Privilege; |
| MBG: | Multi-switch Business Group; |
| NANP: | North American Numbering Plan; |
| NAP: | Network Access Point; |
| NCOS: | Network Class of Service; |
| OSID: | Originating Switch Identification; |
| OTG: | Originating Trunk Group; |
| PBX: | Private Branch Exchange; |
| PNR: | Private Network Record; |
| PSTN: | Public Switching Telephone Network; |
| SCP: | Service Control Point; |
| SP: | Signalling Point; |
| SSP: | Service Switching Point; |
| SSP DAL: | Service Switching Point Dedicated Access Line; |
| TO: | Tandem Office; |
| TO TC: | Tandem Office Toll Completion; |
| TSID: | Terminating Switch Identification; |
| TTG: | Terminating Trunk Group; |
| VPN: | Virtual Private Network. |

Figure 1:
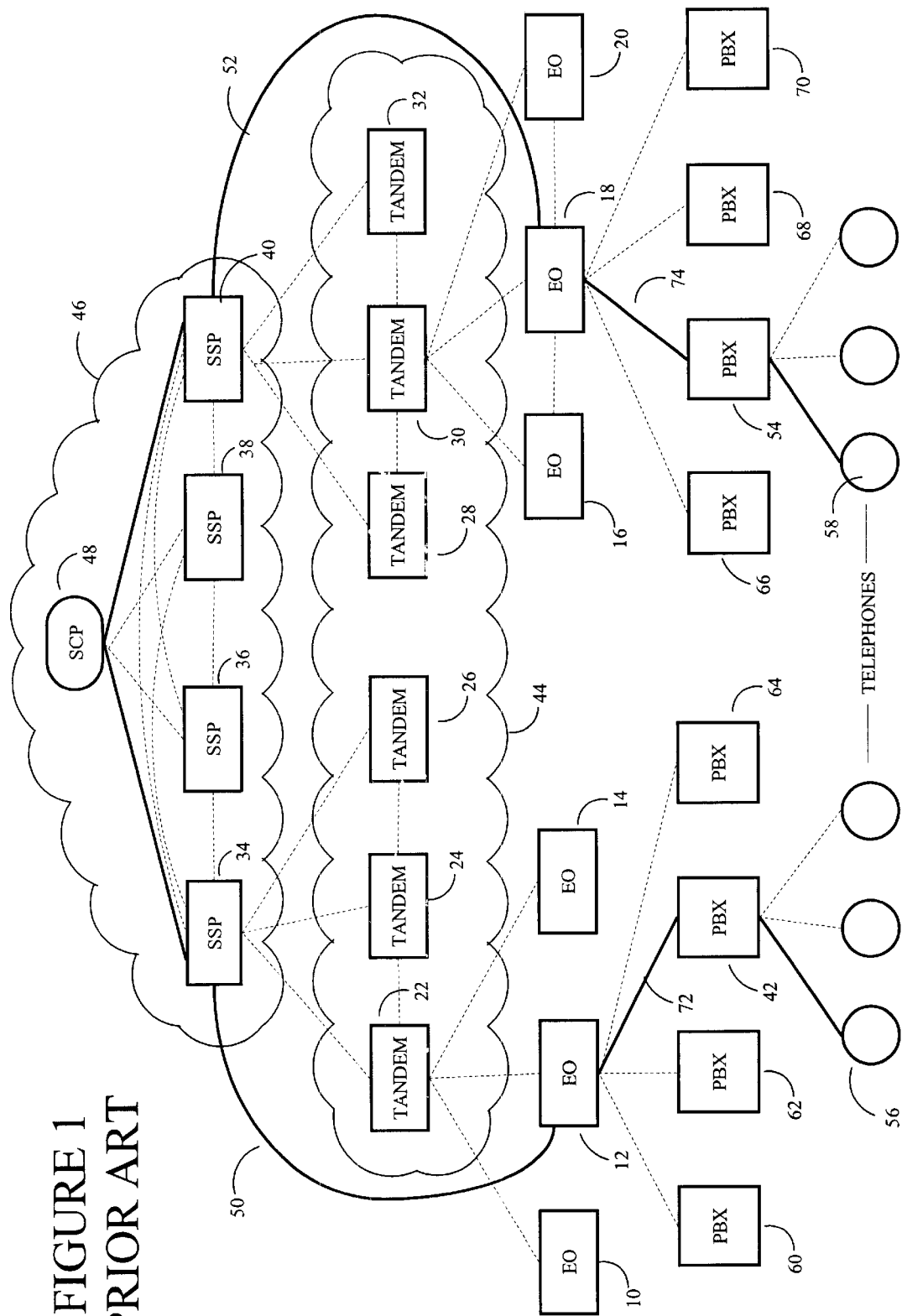
FIG. 1 is a diagrammatic view of an existing telephone network architecture.

Referring to FIG. 1, a typical Common Channel Signalling 7 (CCS7) network consists of signalling links and nodes. CCS7 nodes are referred to as Signalling Points (SP) and are interconnected by signalling links. Each CCS7

Signalling Point is assigned a unique point code, serving as the network address for message routing. CCS7 Signalling Points (SP) may include End Offices 10, 12, 14, 16, 18, and 20 (EOs), Intermediate Switches such as Tandem Offices 22, 24, 26, 28, 30, and 32 (TOs), and Service Switching Points 34, 36, 38, and 40 (SSPs).

Signalling Points (SPs) are capable of sending and receiving CCS7 messages with other CCS7 equipped telephone offices, and routing calls based on the information exchanged. Incoming messages are formatted and transferred to the relevant processing function in the switch. Generally, the processing functions comprise a number of databases or translation tables, which are indexed by the values of parameters in the incoming message, to provide routing or other handling instructions. Outgoing messages are prepared and transmitted over the signalling links.

There are a great number of different CCS7 messages which are known in the art. The first CCS7 message a Signalling Point transmits to begin establishing a circuit connection, is known as an Initial Address Message, or IAM. An IAM contains a number of parameters, which provide information necessary to query a Called Party, as to whether it may receive a call from the Calling Party. To a degree, the data content of an IAM is flexible, and may include Called Party Number (CdPN), Calling Party Number (CgPN), Generic Address Parameter (GAP) and Business Group (BG) data, and additional information for billing purposes or to access special network features. The Initial Address Message (IAM) is contained in the ISDN User Part (ISUP) of the CCS7 protocol. The ISUP protocol defines the functions and signalling information to set up and release calls over circuit-switched connections.

The invention will be described in terms of how an IAM is prepared and routed via the network. The handling of other CCS7 messages in the manner of the invention, follows logically from this example.

End Offices 10, 12, 14, 16, 18, and 20, or EOs, are also referred to as Central Offices, and may be equipped with programmable Digital Multiplex System (DMS) switches for routing calls to a plurality of other EOs, an Intermediate Office such as a Tandem Office (TO), or a Service Switching Point (SSP). In FIG. 1, for example, EO 12 may route calls to EO 10 or 14, to TO 22, or to SSP 34. Northern Telecom DMS100 switches may be used as EOs.

All telephone company customers are connected directly to an End Office 10, 12, 14, 16, 18, or 20, which is generally referred to as the Network Access Point (NAP) for that customer, but may also be referred to as the Originating End Office or Ingress End Office. The Network Access Point for customer site 42, represented herein within a Private Branch Exchange (PBX), would be EO 12, generally referred to as the EO NAP for that customer site. It is understood that the customer premises equipment could comprise equipment other than a PBX, and that a PBX implementation is shown for the purposes of example and is not necessary to the invention. The EO NAP 12 contains software and internal databases for preparing Initial Address Messages (IAMs) associated with transmitted calls, and for transmitting such IAMs to other Switching Points. The EOs 10, 12, 14, 16, 18, and 20, are also capable of halting call progress, launching a CCS7 query requesting additional routing information, and then routing or treating the call based on the information received in response.

For convenience, the Public Network is described herein as comprising both a Public Switched Telephone Network (PSTN) 44, and an Overlay Network 46. It is understood however, that in some network architectures, an Overlay Network may not exist, or may not be distinguishable from the PSTN 44. The invention may apply equally to such architectures.

The Public Switched Telephone Network 44 comprises a plurality of local area Intermediate Switches, such as Tandem Offices 22, 24, 26, 28, 30, and 32 (TOs), which may be equipped with programmable Digital Multiplex System (DMS) switches, such as Northern Telecom DMS200 switches. The TOs 22, 24, 26, 28, 30, and 32, may be capable of communicating with a plurality of other TOs, a plurality of EOs and a regional SSP. In FIG. 1, for example, TO 22 may route calls to EO 10, 12 or 14, to TO 24, or to SSP 34.

Intermediate Switches, represented herein as Tandem Offices 22, 24, 26, 28, 30, and 32 (TOs), are special CCS7 nodes which provide a message switching function between other nodes and a CCS7 network. Acting as packet switches, they examine incoming messages and route them over the appropriate signalling link to the proper destination SP or database. Unlike other CCS7 nodes, TOs 22, 24, 26, 28, 30, and 32 do not generally act as a source or sink for CCS7 messages. It is understood however, that other switches could be used as intermediate switches in a manner of the invention, and that some of these switches may have intelligence beyond that required by the invention.

The Overlay Network 46, comprises a plurality of regional Service Switching Points 34, 36, 38, and 40 (SSPs), each of which connects to a plurality of local area TOs. SSPs 34, 36, 38, and 40 are equipped with programmable Digital Multiplex Systems, such as Northern Telecom DMS250 switches. The Overlay Network 46 may also include a central database, or Service Control Point (SCP) 48 which comprises software and internal databases necessary to interface with the SSPs 34, 36, 38, and 40 for routing telephone calls through the network. Queries and responses to and from an SSP 34, 36, 38, and 40, are carried over CCS7 signalling links in the form of packet messages. In FIG. 1, for example, SSP 34 may route calls to TO 22, 24 or 26, to SSP 36, 38 or 40, or send a query to Service Control Point 48.

The Service Control Point 48 (SCP) is a central database which may be queried by SSPs 34, 36, 38, and 40 to obtain routing instructions or access to special features.

Firstly, an implementation of a Private Network as known in the prior art, will be described with respect to FIG. 1.

A Private Network is usually provided for a Business Group and access thereto is limited to authorized members of the group. When a business group has more than one site, heretofore, it has been necessary to provide direct physical connections, known as Dedicated Access Lines, 50 and 52, between each of the business group sites, 42 and 54, and the Overlay Network 46, via End Offices 12 and 18. Calls from one customer site 42 to another customer site 54 would be routed from the originating customer or Calling Party 56, via the originating customer site's Private Branch Exchange 42 (PBX), to its local Network Access Point, originating End Office 12, then directly to a predetermined SSP 34 in the Overlay Network 46, via the Dedicated Access Line 50. The Overlay Network 46 is programmed to forward the IAM to the destination customer, or Called Party 58, via SSP 40, DAL 52 and destination End Office 18 to the destination customer site served by PBX 54, which forwards the IAM to the Called Party 58. Customer sites are identified in FIG. 1 as comprising Private Branch Exchanges 42, 54, 60, 62, 64, 66, 68 and 70 (PBXs) serving a number of telephones, but it is understood that other customer premises equipment such as other private exchanges or single telephones may apply.

In a typical PN DAL service, End Office (EO) 12 is connected to a customer's site 42 via an EO Dedicated Access Line (EO DAL) 72, and similarly, customer site 54 is connected to EO 18 via EO DAL 74. The term DAL is representative of the fact that the access to the service is dedicated to this purpose. In order to deploy a Private Network with Dedicated Access Lines across multiple sites in various locations, private trunks 50 and 52, or SSP DALs, are required to offer customers dedicated services between the two sites. These SSP DALs 50 and 52 may be DS1 links which allow a number of customer's dedicated access lines to be supported on the same trunk between EO 12 and SSP 34, and between EO 18 and SSP 40, respectively. Although the DS1 links between EO 12 and SSP 34 are shared among customers, each customer site has a dedicated DS0 trunk for a given BG site. Each customer purchases DS0 trunks which are physically assigned between the EOs serving their business sites and the regional SSP serving the respective EO.

It will be understood that providing physically dedicated lines 50 and 52 for a particular customer, between EOs and respective SSPs separated by hundreds or thousands of miles, is extremely expensive. Private Networks have been provisioned in this manner because of a regulatory requirement to keep the networks private, and secure from access by outside callers, and to outside callers.

Note that FIG. 1 is just one example of a typical VPN, and that other networks and configurations will equally apply to the invention.

Figure 2:
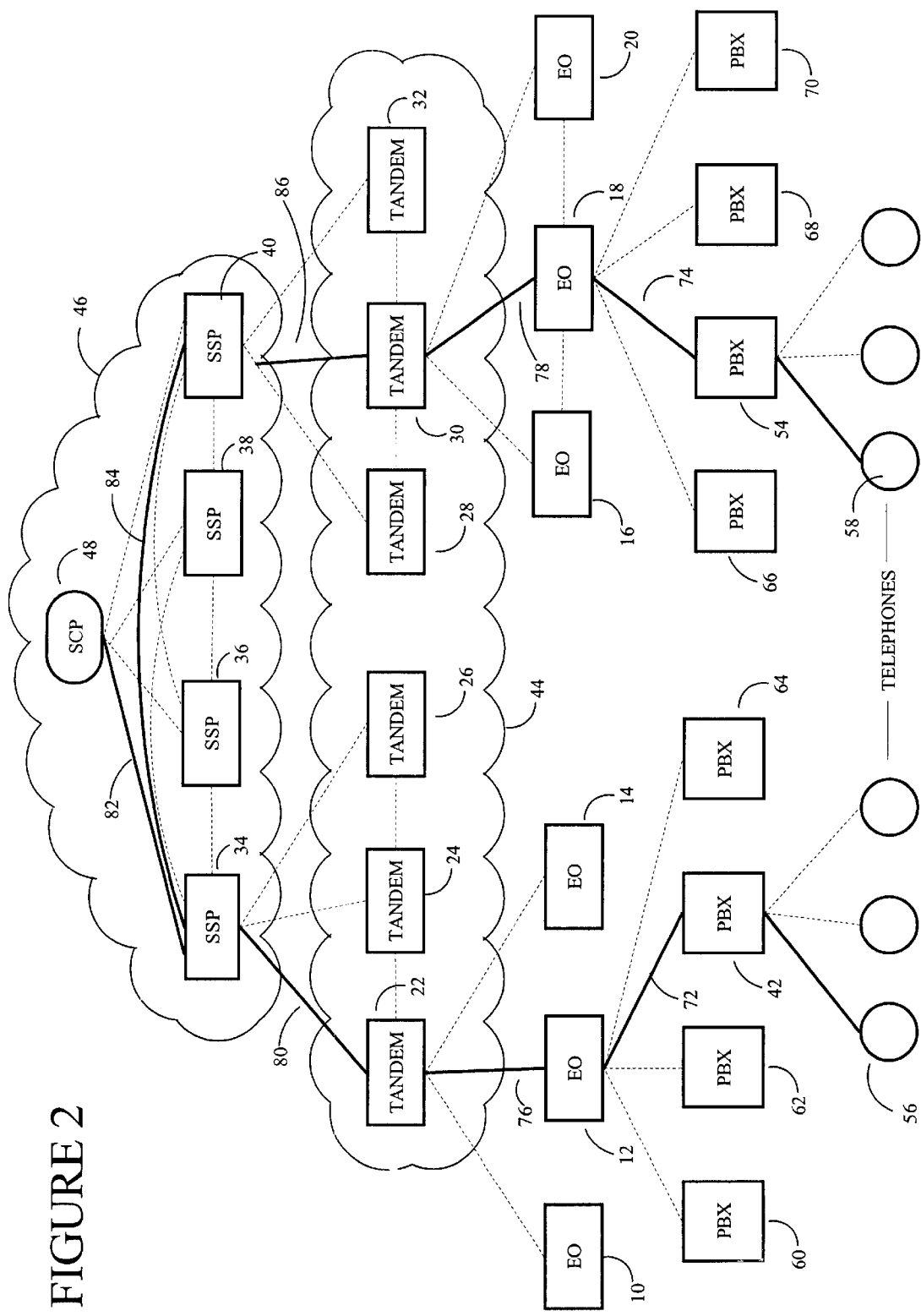
FIG. 2 is a diagrammatic view of a telephone network architecture in an embodiment of the invention.

An embodiment of the invention will now be described with respect to FIG. 2. In the discussion of FIG. 2, the terms "Ingress" or "Originating" will be used to describe the transmission of the IAM between the originating customer or Calling Party 56 and the Service Control Point 48 in the Overlay Network 46. The terms "Egress" or "Destination" will be used to describe the transmission of the IAM between the Service Control Point 48 and the destination customer or Called Party 58. Those Switching Points which serve on ingress will be referred to as "Ingress" or "Originating" Switching Points, and those serving on egress, will be referred to as "Egress" or "Destination" Switching Points.

In the discussion of VDAL Queries and Routing Messages which appears later, note that the SSP 34 which sends a VDAL Query to the SCP 48, also receives the Routing Message from the SCP 48, and is referred to as the Ingress SSP 34, to distinguish it from the Terminating SSP 40. This explains the reference to an Ingress SSP 34 which appears in the discussion of IAM Egress from the SCP 48.

As indicated above, one of the service features of a VPN DAL service is the ability to support a customer private dialling plan. The customer defined private dialling plan would enable a Calling Party 56 located at the originating customer site 42 to reach a Called Party 58 located at a destination customer site 54 using, for example, an abbreviated dial plan unique to this customer.

Also as indicated above, providing private trunks to a customer is a relatively costly method of provisioning the VPN service, for both the customer and the service provider. Because the End Office 12 (EO) and associated Service Switching Point 34 (SSP) may be hundreds of miles apart, the cost of installing and maintaining a physically dedicated trunk may be very great. Furthermore, such a system will not have the reliability of the Public Switched Telephone Network 44 (PSTN) because of both the great physical lengths of the SSP DALs, and because the SSP DALs lack the redundancy of the PSTN 44.

The present invention provides a method and an apparatus which enables the regulatory requirement for controlled access to be met while avoiding the need for physical SSP Dedicated Access Lines 50 and 52. This is achieved by routing the IAM from EO 12 to SSP 34, via the PSTN 44, then from EO 18 to SSP 40 via the PSTN 44, instead of using SSP DALs 50 and 52, and by inserting VPN specific information in the Initial Address Message (IAM) associated with each call. The invention also provides for storing of VDAL specific information in each EO which provides VPN services and in the SCP 48, as explained herein below.

Note that in a manner of the invention, EO DALs will still exist, which are dedicated lines between the customer's site and its EO NAP, identified as 12 and 18 in FIG. 2, while DALs in the prior art included both EO DALs, and SSP DALs. The invention may be implemented without the known SSP DALs, which were dedicated lines between the customer's EO NAP and the regional SSP, identified as 50 and 52 in FIG. 1.

The architecture of the present invention provides the ability to utilize EO DAL ingress and egress to and from the Overlay Network 46 based services in order to allow these EOs to place and receive VPN DAL calls. This section provides a description of the architecture, trunking requirements, and routing requirements.

A typical architecture required to provide a Virtual Private Network (VPN) via the PSTN, from EO DALs, is presented in the block diagram of FIG. 2. This figure depicts a simple TO toll network only. It is understood that other intermediate switches such as toll or tandem switches, or other network configurations may apply equally to the invention. With the configuration illustrated, the network costs of providing dedicated access is reduced by allowing the use of the existing PSTN infrastructure 44 to support VPN traffic.

The trunk groups 50 and 52, heretofore required between the EO 12 and SSP 34, and EO 18 and SSP 40 pairings, are no longer mandatory, although they may be implemented where warranted by traffic volume considerations. These trunk groups 50 and 52 could remain as SSP DALs, be used as shared trunk groups accessible by Private Network customers only, or be available to all customers as shared public trunk groups.

With this network arrangement, the access portion of the DAL connection between a customer main office 42 and the Ingress End Office 12 is still provisioned via a physically Dedicated Access Line (DAL) 72. Similarly, the egress portion of the connection, between the Egress End Office 18 (EO) and the customer's branch office 54 is also provisioned with a physically Dedicated Access Line (DAL) 74. However, the connection between the customer's Originating EO 12 and Destination EO 18, and the PSTN 44 is established via public CCS7 trunks 76 and 78. These public CCS7 trunks 76 and 78 may be shared trunk groups or shared trunk groups segregated for business customers only.

To route a VPN IAM in this manner, the CCS7 message originating from EO 12, the Initial Address Message (IAM), is modified to enable routing via the PSTN 44. As will be described in further detail below, the modified CCS7 message is sent on a CCS7 trunk 76 linking the EO 12 to a Tandem Office 22 of the PSTN 44. The Tandem Office 22 has access to a shared trunk 80 to the Ingress SSP 34 of the Overlay Network 46. The Ingress SSP 34 can then launch a query, or VDAL Query, to a centralized database 48, or SCP, via trunk group 82, in order to provide the subscriber the required service to complete the call. A response is returned by the SCP 48, again via trunk group 82, to the Ingress SSP 34, which modifies the IAM and transmits it to the Egress Tandem Office 30 directly, if such a routing exists, or via a Terminating SSP 40, as shown, on trunk group 84. Either way, a shared trunk group, such as 86, is used to return the IAM to the PSTN 44. From the Egress TO 30, the new IAM is routed to the destination EO 18, via public CCS7 trunk 78, then via the dedicated access line 74 to the destination customer site 54. The destination customer site then addresses the Called Party 58.

VPN customer sites in a manner of the invention, will continue to be identified with a SSP identification and trunk group assignment which uniquely identify the site in the same manner as in the past for SSP DALs, whether the SSP DAL exists or has been removed. The same switch ID and trunk group combination is used on both ingress and egress. From an ingress perspective, the switch ID and trunk group assignment will be referred to as OSID (Originating Switch ID) and OTG (Originating Trunk Group) respectively. From an egress perspective, the switch ID and trunk group assignment will be referred to as TSID (Terminating Switch ID) and TTG (Terminating Trunk Group) respectively.

Therefore, for a given EO DAL to a given customer site, OSID=TSID, and OTG=TTG. OSID and TSID are three digit numbers identifying the SSP serving the customer site. The OTG and TTG are four digit numbers which may identify a trunk group leaving the SSP, if it exists, or it may be an assigned number, if no such SSP DAL exists. Regardless, in a manner of the invention the OSID and OTG combination provides a unique customer site identification.

In the prior art, the OSID and OTG combination were used to identify an actual physical SSP DALs. These SSP DALs may no longer exist because they are not required to provide a VPN in a manner of the invention, so the TTG and OTG could be assigned numbers that do not refer to actual physical SSP DALs.

In order to provide added redundancy to certain customers, there may also be provided an SSP DAL, between the EO NAP and SSP dedicated to a site, as known in the art, and described above. It should be noted that this will serve the requirements for a single customer site. However, a more efficient solution is to pursue multiple exit points from the EO NAP so that all customers and all services benefit from this configuration. Areas such as Montreal, where EO NAPs are linked to three toll switches, EO DAL calls will have sufficient redundancy to avoid the need for these dedicated customer trunk groups. This special configuration is not necessary in such areas, since coincident switch failures would be required to isolate the EO NAP.

Figure 3A:
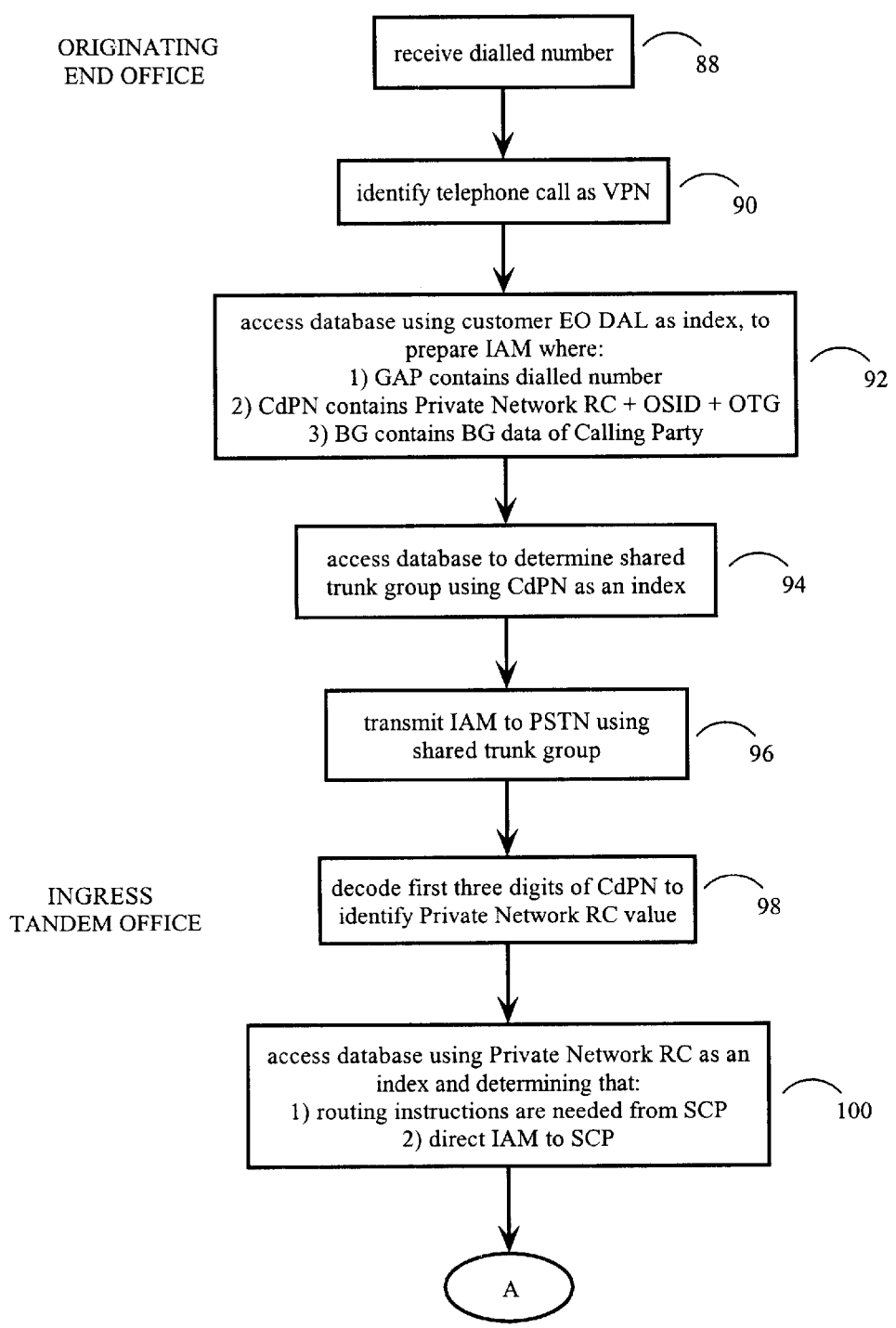
FIGS. 3a and 3b are flow diagrams identifying the process steps of a telephone call placed over a VPN system, during ingress to the Service Control Point, in an embodiment of the invention.

The IAM routing method of the present invention will now be described with reference to FIGS. 3a and 3b, which present the method steps of handling the IAM on ingress to the SCP 48 in the form of a flow diagram, and with reference to FIGS. 4a and 4b, which present the method steps of handling the IAM on egress from the SCP 48. In the interest of brevity, a large number of detailed steps, known in the art, have not been listed. Such steps would include, for example: Calling Party going off-hook, EO 10 recognizing off-hook status and sending dial tone to Calling Party, digits being dialled by Calling Party, etc.

In this example, the IAM is being routed through the network as shown in FIG. 2, and described above. The IAM will be described as an IAM being routed through a Terminating SSP 40, but it is understood that the IAM could take various routings. Also, for the purpose of this example, we can assume that the originating customer site location 42 of Calling Party 56 has direct access to a VPN type service.

When Calling Party 56 wishes to reach a Called Party 58 accessible via the VPN, the Calling Party 56 dials a series of digits identifying to the network the Called Party 58. Step 88 identified in FIG. 3a, is the step of receiving the dialled number at the Ingress End Office Network Access Point 12. The dialled number received can be in any one of the following formats, though the format most pertinent to the invention is the second case, "Call to private number (1 to 15 digits)":

| | |
|---|---|
| (ac)-NXX-XXXX | Call to seven digit private number |
| (ac)-NXX . . . X | Call to private number (1 to 15 digits) |
| (ac)-1-NPA-NXX-XXXX | Call to ten digit NANP number |
| (ac)-011-CC-NN | Call to IDDD number |
| where: | |
| N = | 2, 3, . . . , 9 |
| (ac) = | optional access code |
| X, A = | 0, 1, . . . , 9 |
| P = | 0, 1, . . . , 9 |
| CC = | Country Code; and |
| NN = | National Number. |

The originating EO 12 identifies that a call has been received over the EO DAL 72, and determines the customer group associated with the selected trunk or EO DAL 72, at step 90. Within the originating EO 12 are internal databases which are programmed to prepare an Initial Address Message (IAM) appropriate to the IAM party and dialled number. As detailed below, these programmed instructions are not specific to the private numbering plan, and need not be changed with changes to the numbering plan or members of the VPN.

Note that the connection from the EO NAP to the customer may be provided in a number of ways, including the following:

1. Virtual Facility Groups for Centrex, BRI, and PBX trunks within a Centrex Customer group (IBN trunks to local);
2. Dedicated trunks for PBXs; or
3. Dedicated lines for PBXs, Multi Line Key systems, and single line access.

Other modes of connection may also apply to the invention.

The originating EO 12 prepares a CCS7 message to provide an indication to the network that the IAM originates from a VDAL subscriber. At step 92 of this example, ISUP parameters are used as part of the CCS7 message to carry the required information. The translation table moves the dialled number to the Generic Address Parameter (GAP) of the ISUP message. Embedding the dialled number in the GAP allows greater flexibility than the CdPN parameter, as done in the prior art, because the GAP has a flexible field length, while the CdPN parameter does not. This allows much greater flexibility in arrangement of access codes, private numbering plans or other codes that might be dialled. Similarly, the dialled number could be embedded in other available parameters of the ISUP provided they do not conflict with other system operations and provide sufficient field length.

The Called Party Number (CdPN) parameter, which is also an ISUP parameter in the Initial Address Message (IAM), is loaded with the following data fill:

129+OSID+OTG, or

130+OSID+OTG where:

| | |
|---|---|
| 129, 130: | Private Network Routing Codes that identify the IAM as originating from a VPN customer, and route it to a SSP; |
| OSID: | Three digit, Originating Switch ID corresponding to the Originating customer site; and |
| OTG: | Four digit Originating Trunk Group corresponding to the Originating customer site. |

A different Private Network Routing Code may be used to route calls to different trunk groups at the VPN exchange to trigger the appropriate set of announcements, for example, on the basis of preferred customer language. The decision to use either one is based on a customer subscription option.

As previously noted, each VPN customer has a unique OSID+OTG address, either based on the identity of the Dedicated Access Line between its EO and SSP, or being an assigned value. In an embodiment of the invention, new VPN customers which are not associated with an existing DAL between an EO and a SSP, such as 50 or 52 in FIG. 1, also called SSP DALs, will be assigned new OSID and OTG numbers which are not representative of actual, physical SSP DALs.

The third component of the IAM is the placing of the Business Group Identification (BGid) of the customer business group of the calling customer, into the BG parameter. Because a customer site may have more than one EO DAL, and hence more than one OSID+OTG identification, the BGid is used to identify that customer site. This BGid will be used in the SCP 48 to select the privileges that the customer site has access to, and to verify that the Calling and Called parties are authorized members of the same Private Network. The Calling and Called Parties may have different BGids, but be members of the same Private Network. This allows the invention to control access to and from the Private Network.

At step 94, the IAM then proceeds to an internal database or standard routing translator, common to each EO in the network, to select an available PSTN trunk to route the IAM to an available TO.

It should be noted that although the CdPN is being used to index the routing table, as known in the art, the CdPN parameter in the invention does not contain the Called Party Number, but contains the Private Network Routing Code+OSID+OTG. The standard routing translator is responsive to the Private Network Routing Code without any modifications, because the first character is a "1" which is not associated with a valid NANP area code, which selects an egress trunk group for the IAM to obtain additional routing instructions.

When a direct EO NAP to SSP trunk group such as 50 or 52, is busy or nonexistent, the traffic is routed via a PSTN 44 route. The trunk group between the EO NAP 12 and the TO 22 of the PSTN 44, is the existing toll connect trunk group 76. The PSTN 44 uses routing techniques known in the art, to route the IAM to the Overlay Network 46.

The trunk groups can be datafilled to either play inband treatments to the user, or to release the IAM back to the EO NAP with a CSS7 ISUP release message. For voice calls it may be desirable to have the SCP play an inband treatment, for example, "You have entered an invalid account code", in the preferred language of the customer. For ISDN data calls, inband treatments are not needed as data terminals are typically not equipped with speakers. Thus, for ISDN calls, it is therefore appropriate to release the IAM with a cause value that can be interpreted by the ISDN terminal.

In a manner of the invention, the selection of the trunk groups is determined by the Private Network Routing Code inserted in the IAM by the customer's pre-programmed translations in the originating end office 12, as explained above. As an example, typical Private Network Routing Codes could comprise:

1. a set of English voice trunk groups (pointed to by Private Network Routing Code=129);
2. a set of French voice trunk groups (pointed to by Private Network Routing Code=130); and
3. a set of data trunk groups (pointed to by either Private Network Routing Code=129 or Private Network Routing Code=130).

As noted above, if the direct EO NAP to SSP trunk group is busy, or nonexistent, EO DAL calls may be routed to the SSP via the PSTN 44. To do so in accordance with the present invention, the EO NAP inserts a Private Network Routing Code in place of the area code field of the Called Party Number parameter (CdPN) of the IAM. The Private Network Routing Code will be identified as a special routing code within the network and will direct calls to an SSP.

At step 96, the IAM is forwarded from the originating EO 12, via the outgoing trunk, such as a toll connect, or shared trunk group 76, to reach the Ingress Tandem Office 22. The IAM leaving the originating EO 12 contains the following key components:

| | |
|---|---|
| CdPN = | Private Network Routing Code + OSID + OTG |
| GAP = | NXX-XXXX |
| | NXX . . . X |
| | 1-NPA-NXX-XXXX |
| | 011-CC-NN |
| BG = | Business Group Data (of the Calling Party) |

The Ingress Tandem Office 22 on the PSTN 44, receives the IAM and decodes the initial digits of the CdPN parameter, to determine the Private Network Routing Code, at step 98. As the Private Network Routing Code does not represent a valid area code, the Ingress Tandem Office 22, accesses an internal database or translation table using the Private Network Routing Code value as an index, to determine how to handle the call, at step 100 of FIG. 3b. The datafill of the translation table directs the Ingress TO 22 to forward the IAM to an Ingress SSP 34 for routing instructions.

Figure 3B:
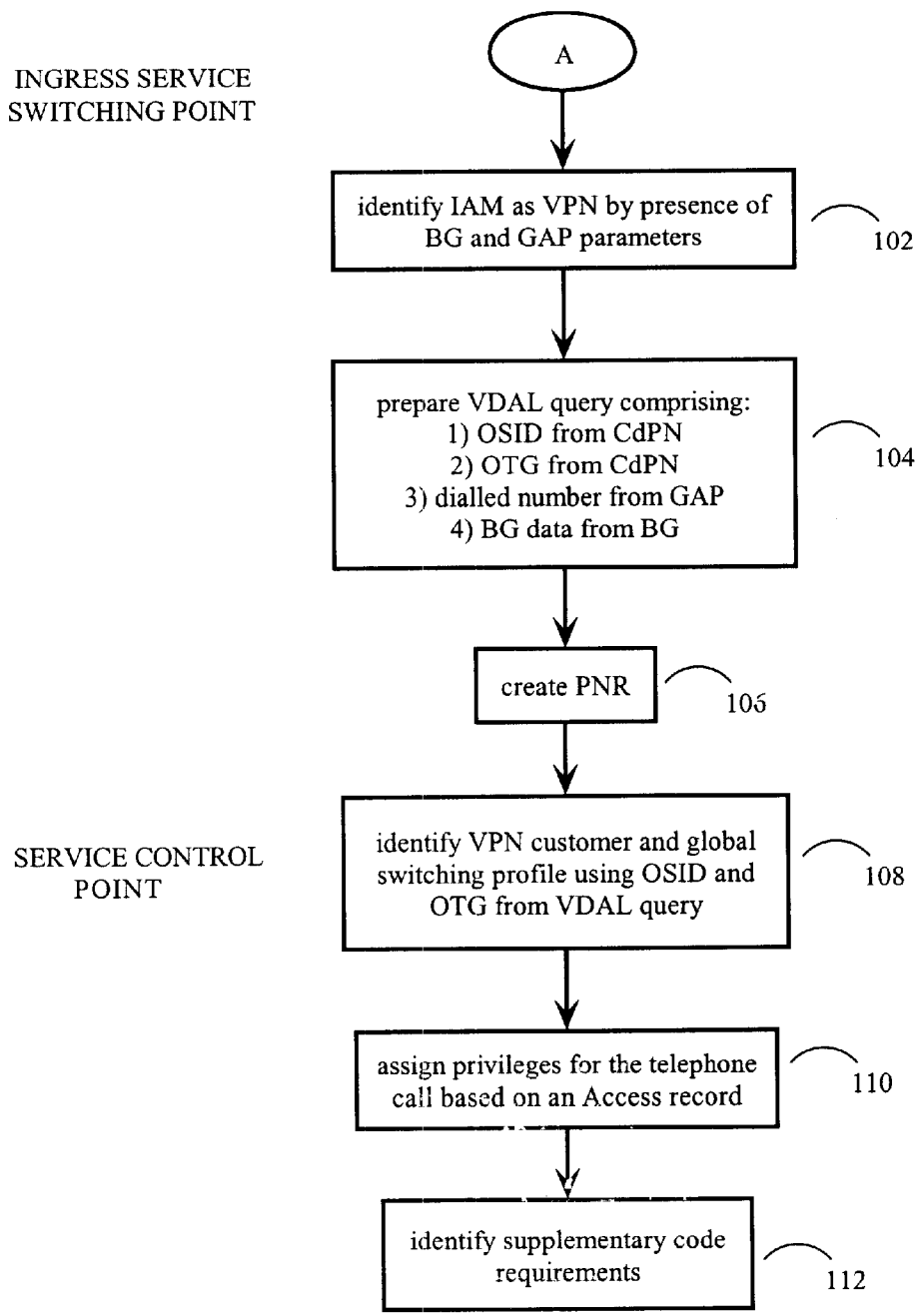

When the IAM message originating from the Originating EO 12 is received at the Ingress SSP 34, the IAM is identified as originating from a VPN customer by the presence of the BG and GAP parameters contained in the ISUP message of the IAM, as noted at step 102 of FIG. 3b.

At step 104, the Ingress SSP 34 then launches a VDAL Query to a centralized database or Service Control Point (SCP) 48, with the appropriate information:

| | | |
|---|---|---|
| Switch ID = | OSID (extracted from the CdPN parameter) | |
| Trunk Group = | OTG (extracted from the CdPN parameter) | |
| Address = | NXX-XXXX | (Nature Of Call = 1) |
| | NXX . . . X | (Nature Of Call = 1) |
| | NPA-NXX-XXXX | (Nature Of Call = 3) |
| | CC-NN | (Nature Of Call = 4) |
| BG = | Business Group Data | (of the Calling Party) |

The Ingress SSP 34 then generates a Private Network Record (PNR) to keep track of the customer's calls, noted at step 106.

The SCP 48 receives the VDAL Query, and establishes parameters required to prepare a Routing Message:
1. Use OSID+OTG to identify the VPN Calling Party, and the global switch profile at step 108,
2. Assign the privileges for this IAM based on the OSID+OTG access record, at step 110, and
3. Identify supplementary code requirements at step 112.

The preparation of the Routing Message at the SCP 48, is described following, with respect to the egress steps.

Figure 4A:
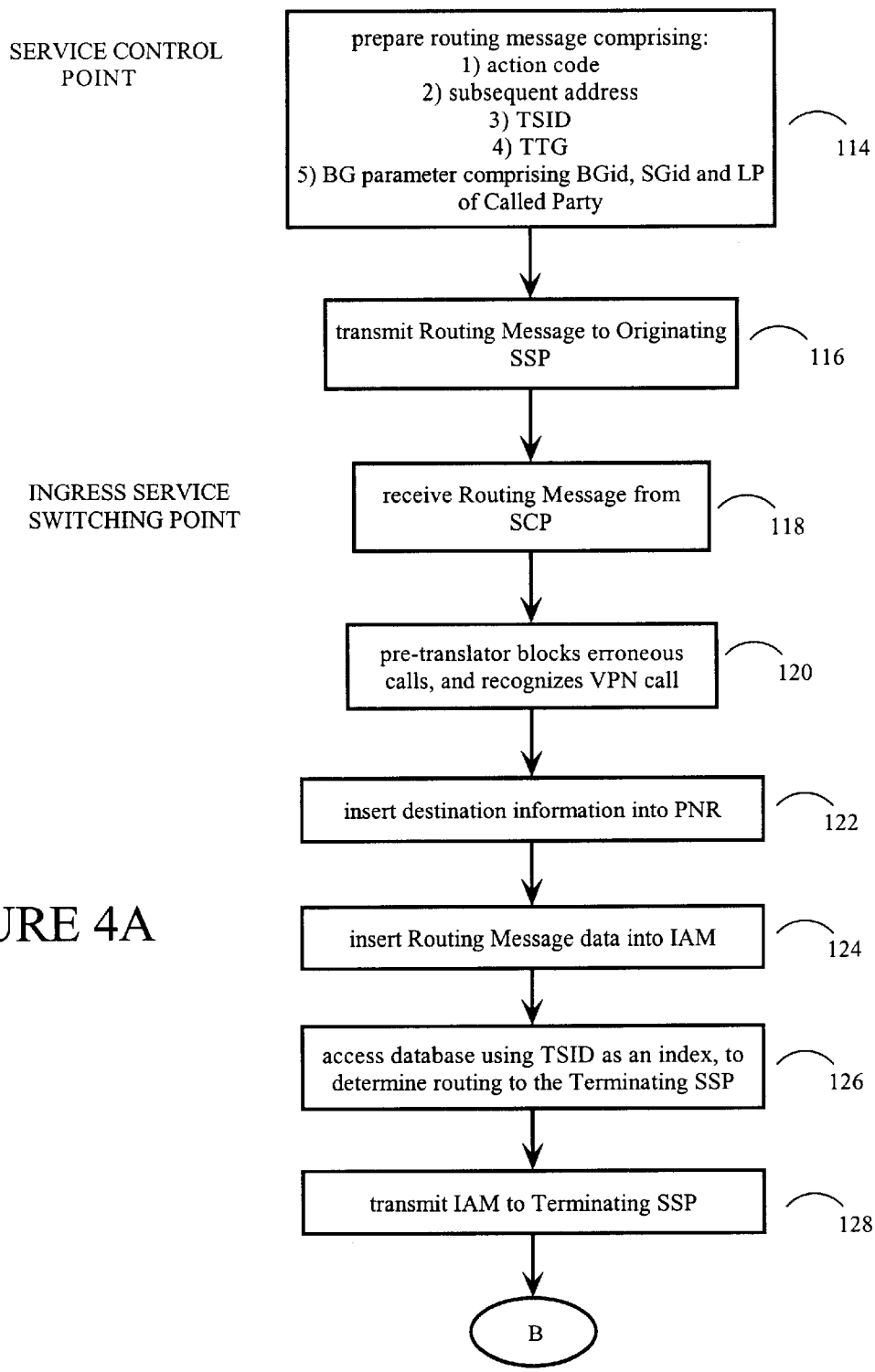
FIGS. 4a and 4b are flow diagrams identifying the process steps of a telephone call placed over a VPN DAL system, during egress from the Service Control Point, in an embodiment of the invention.
Figure 4B:
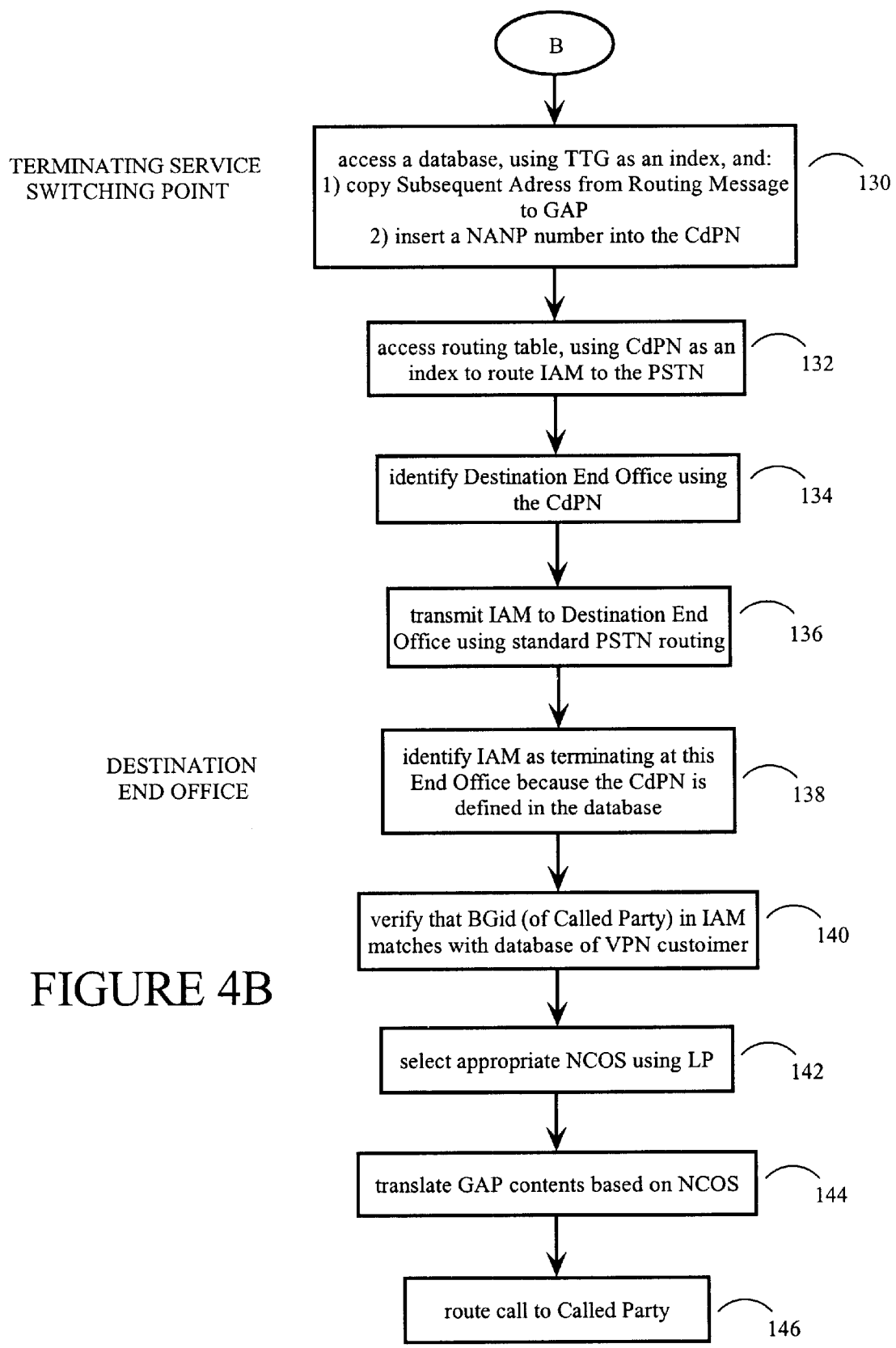

With reference to FIGS. 4a and 4b, the method steps for the egress of the IAM from the SCP 48 to the destination EO 18 and on to the destination customer site 54 are described. The general process on egress is for the SCP to issue a Routing Message to the Ingress SSP 34, which is routed from the Ingress SSP 34 to the Terminating SSP 40. The Terminating SSP 40 accesses a database to determine a routing number identifying the destination End Office Switch 18, which can be routed by the PSTN 44. In North America, this destination End Office Switch 18 routing number is usually in the North American Numbering Plan (NANP) format. This routing number is inserted into the CdPN parameter of the IAM to route the IAM through the PSTN 44 to the destination EO 18. This routing number is defined on the destination EO 18, which can then receive the IAM and route it to the Called Party 58.

For egress, the dedicated trunk group 52 between the SSP 40 and EO NAP 18 is no longer mandatory. EO DAL traffic now may be routed, according the present invention, via the PSTN 44 over trunk groups 86 and 78 in FIG. 2. These public trunk groups need not be dedicated to EO DAL calls and can carry two way traffic. The TO to EO trunk group identified as 78, may also be described as an existing toll completion trunk group.

Therefore, on egress, voice calls to EO DALs have three routing options:
1. Route from SSP 40 to EO NAP 18 directly using an existing physical direct line 52;
2. Route from SSP 40 to a TO TC 30 of the EO NAP 18. TO TC refers to TO Toll Completion and represents a Tandem Office that supports the toll completion trunk group to a particular End Office; or,
3. Route from the SSP 40 to any other TO, such as 28 or 32, and then route to the TO TC 30 of the EO NAP 18. From the TO TC 30 of the EO NAP 18, the IAM is routed directly to the EO NAP 18.

When the IAM leaves the terminating SSP 40, the terminating SSP 40 inserts the destination end office identification, which may be a NANP public routing number, into the Called Number Parameter (CdPN) of the IAM to route the IAM through the PSTN 44 to the Destination EO NAP 18. This public routing number is a number which is defined on the destination EO NAP 18. New PSTN numbers will be defined on each EO NAP 18 supplying the service in a manner of the invention.

In a manner of the invention, this new NANP number is defined in a database in the Terminating SSP 40, indexed by the unique TSID+TTG identification of the destination customer site 54.

Before the Ingress SSP 34 can provide an updated IAM through the PSTN 44 to the Destination EO 18, a Routing Message from the SCP 48 is prepared at step 114, and is sent to the Ingress SSP 34 at step 116. This Routing Message contains the necessary information for the Ingress SSP 34 to modify the IAM, as noted at step 114:

AC=Action Codes 1, 2, 10, 11, 50 or 51

7 or 10 digit subsequent address (for AC=1, 2, 10, 11)= NXX-XXXX or NXX-XXX-XXXX Variable length subsequent address (for AC=50, 51)= NXX . . . X Destination Switch ID=TSID Destination Trunk Group=TTG BG=Business Group Data (of the Called Party)

In an embodiment of the invention, Action Codes have been defined as follows:
1. Action Codes 1 and 2 define an IAM to a DAL with seven digit delivery.
   Action Code 2 indicates that Direct Termination Overflow (DTO) is available, Action Code 1 indicates that DTO is not available.
2. Action Codes 10 and 11 define an IAM to a DAL with ten digit delivery.
   Action Code 11 indicates that DTO is available, Action Code 10 indicates that DTO is not available.
3. Action Codes 50 and 51 define an IAM to a DAL with a flexible address digit delivery (1 to 15 digits). Action Code 51 indicates that DTO is available, Action Code 50 indicates that DTO is not available.

Similar codes may also be created to handle other tasks, as known in the art. Such additional codes would not preclude the invention as disclosed herein.

The Business Group Identification (BGid) of the destination customer site, or Called Party, is also datafilled in the SCP 48, which the Ingress SSP 34 places into the BG parameter of the modified IAM on egress. Note that the original IAM contained the BGid of the originating customer site or Calling Party. This distinction is important, because a VPN may be allowed to include members of different Business Groups, having different BGids. The SCP 48 will be programmed with a database of the authorized members of a given VPN, and only allow a Routing Message to be created if the calling and called parties are authorized members of the same VPN. If an attempt is made to place an unauthorized call, the SCP will instruct the Ingress SSP to return a release message to the Originating EO.

The Subsequent Address Parameter contains data that the terminating PBX at the destination customer site 54 may interpret to reach the Called Party 58. This data may be translated by the SCP from the dialled number. This allows a private numbering plan to be defined at the SCP. Having this numbering plan defined on a central database allows for easy modification, in contrast to the distributed control shown in the prior art.

The handling of Direct Termination Overflow (DTO) is not detailed herein, but follows logically from the description of the invention, and would be known to one skilled in the art.

When the Routing Message is received by the Ingress SSP 34 at step 118, it first identifies the Routing Message as such, being returned from the SCP 48. The pre-translator at step 120 is used to block erroneous calls, and is programmed to recognize the format of the Routing Message returning from the SCP 48.

The Ingress SSP 34 may insert destination information into the PNR at step 122 for billing purposes, and places the Routing Message data into the IAM at step 124.

The Ingress SSP 34 then accesses an internal database, or routing table indexed with the TSID, to determine a routing to a Terminating SSP 40 at step 126, and transmits the IAM at step 128. If the IAM is already at the Terminating SSP 40, a corresponding indication will be made, and the IAM not forwarded out of the Ingress SSP 34. That is, if the Calling Party 56 and Called Party 58 are both served by the same SSP, then the Ingress SSP 34 and the Terminating SSP 40 will be that same SSP.

At step 130, the IAM arrives at the Terminating SSP 40 identified by the TSID, and an internal database is accessed with TTG as an index. For an IAM in a manner of the invention, the internal database instructs the Terminating SSP 40 to insert a PSTN 44 routing number into the CdPN parameter of the IAM identifying the destination end office. As noted above, this routing number would be in a NANP format in North America, allowing the IAM to be routed through the PSTN 44 with no changes to the PSTN 44. Each EO DAL, that is, each VPN customer site, will require an entry in this database to translate the IAM into a NANP compatible IAM.

The NANP number inserted in the CdPN is a number defined on the Destination EO 18. The Terminating SSP 40 processes the IAM as per step 130:

1. copy the value of the subsequent address, from the SCP 48 Routing Message or the IAM, into the GAP; and
2. copy the value of the North American Numbering Plan address from the database into the CdPN parameter. Note that this NANP address identifies the destination end office 18.

If for some reason, the BG parameter is not datafilled with the Called Party's BGid at the SCP 48, then the Terminating SSP 40 may provide the datafill from an internal database.

The IAM then proceeds to a standard routing table, at step 132. If no routes are available from the Terminating SSP 40, the IAM is directed to a routing treatment. Such methods are known in the art.

The new IAM is then routed out of the Terminating SSP 40 with the following key information:

| | |
|---|---|
| CdPN = | NPA-NXX-XXXX |
| GAP = | NXX-XXXX, |
| | NXX-XXX-XXXX, or |
| | NXX . . . XX |
| BG = | Business Group Data |

The routing of the IAM through the PSTN 44 is done with no changes from the methods known in the art, as the CdPN now contains an NANP number defined on the Egress TO 30 and identifying the destination EO 18. This is represented in the example by the steps of 134 and 136, through an Egress TO 30, which routes the IAM to the Destination EO 18. Of course, the IAM could be routed through a number of Tandem Offices or other intermediate switches, in being transmitted through the PSTN 44, with no change to the method of the invention.

At step 138, the IAM reaches the Destination EO 18, and is identified as terminating at the Destination EO 18 since the CdPN is defined in an internal database. Processing of the IAM is now completed with procedures known in the art. These may include: using the line attribute to identify the translator type, using the BGid to point the IAM into the customer group, using the Line Privilege to select the appropriate Network Class of Service, and/or translating the contents of the GAP, based on the Network Class of Service (NCOS). Sample steps are shown as steps 140 through 144. The IAM is then transmitted to the Called Party 58 at step 146.

Note that when an IAM is received at the Destination EO 18 in a manner of the invention, it includes the Called Party Business Group. This allows the Destination EO 18 to identify the IAM as being from a member of the same VPN and to reject unauthorized calls from terminating. This prevents regular NANP calls from being allowed to terminate at the VPN customer site.

The invention will now be described briefly, with reference to FIG. 5, outlining the Signalling Points and the data that is transferred between those points, on ingress to the Service Control Point 48. The description will be made with respect to the transfer of an Initial Address Message (IAM) from a Calling Party 56 to a Called Party 58, which comprise two members of a Virtual Private Network in a manner of the invention. As indicated above, the invention is not limited to a network configuration as shown in FIGS. 1 and 2. One skilled in the art would be able to apply the invention equally to different routings or network configurations.

When the Originating EO 12 receives a telephone call from a Calling Party 56, the call is identified as originating from a VPN DAL customer. The Originating EO 12 prepares an IAM in a manner of the invention, using an internal database 148 multiple databases. The contents of the IAM are as follows, identified as 150 in FIG. 5:

| | |
|---|---|
| CdPN = | Private Network Routing Code + OSID + OTG |
| GAP = | NXX-XXXX |
| | NXX . . . X |
| | 1-NPA-NXX-XXXX |
| | 011-CC-NN |
| BG = | Business Group Data (of the Calling Party) |

The CdPN parameter is used to determine the routing of the IAM from the Originating EO 12 to the PSTN 44 by indexing an internal database or routing table 152, as known in the art. However, the CdPN parameter in the invention does not contain the Called Party Number, as known in the art, but contains the Private Network Routing Code+OSID+ OTG values. Routing table 152 is responsive to the Private Network Routing code without any modifications, because the first character of the Private Network Routing Code is a "1" which is not associated with a proper dialled number, specifically a valid NANP area code. This instructs the TO 22 to route the IAM to a SP which can provide additional routing instructions. Accordingly, the IAM is routed to the PSTN 44 via trunk group 76 between the EO 12 and TO 22. At the TO 22, a similar detection is made and the IAM is transmitted to the SSP 34 via trunk group 80.

The IAM is transmitted through the PSTN 44, represented herein by a single TO 22, using additional databases, indexed by the Private Network Routing Code. The Ingress Tandem Office 22 on the PSTN 44, receives the IAM and decodes the initial digits, as it does for all calls, and determines the Private Network Routing Code. The database 154 uses the Private Network Routing Code as an index to determine how to handle the call, and identifies the Private Network Routing Code as not representing a valid area code. The datafill of this internal database 154 directs the Ingress Tandem Office 22 to forward the IAM to an Ingress SSP 34 for routing instructions. The IAM is then routed to the Ingress SSP 24.

The IAM could be routed through a number of TOs without any difficulty, as each successive TO would identify the Private Network Routing Code in the same manner. The last TO on the PSTN 44 to handle the IAM will remove the Private Network Routing Code from the CdPN, but otherwise, the IAM received by the SSP, identified in FIG. 5 as 156, is unchanged from the IAM prepared by the Originating EO 12.

The Ingress SSP 34 identifies the IAM as originating from a VPN customer by the presence of the BG and GAP parameters contained in the ISUP message of the IAM, and accesses a database 158 to prepare a VDAL Query. This VDAL Query is launched to the Service Control Point (SCP) 48, with the information identified as 160 in FIG. 5:

| Switch ID = | OSID (extracted from the CdPN parameter) | |
|---|---|---|
| Trunk Group = | OTG (extracted from the CdPN parameter) | |
| Address = | NXX-XXXX | (Nature Of Call = 1) |
| | NXX . . . X | (Nature Of Call = 1) |
| | NPA-NXX-XXXX | (Nature Of Call = 3) |
| | CC-NN | (Nature Of Call = 4) |
| BG = | Business Group Data | (of the Calling Party) |

The SCP 48 receives this VDAL Query, and as described in greater detail above, prepares a Routing Message by identifying the Calling Party, then accessing necessary databases to provide the Called Party's TSID, TTG and subsequent address. The Called Party's TSID and TTG are further translated in the Terminating SSP 40 to identify a destination EO routing number so that the PSTN 44 can transmit the IAM to the Destination EO 18.

If the data in the VDAL Query received by the SCP 48 is incorrect, or an unauthorized service or access is being requested, the SCP 48 will return an instruction to the Ingress SSP 40 to issue a release message to the calling party 58.

Figure 6:
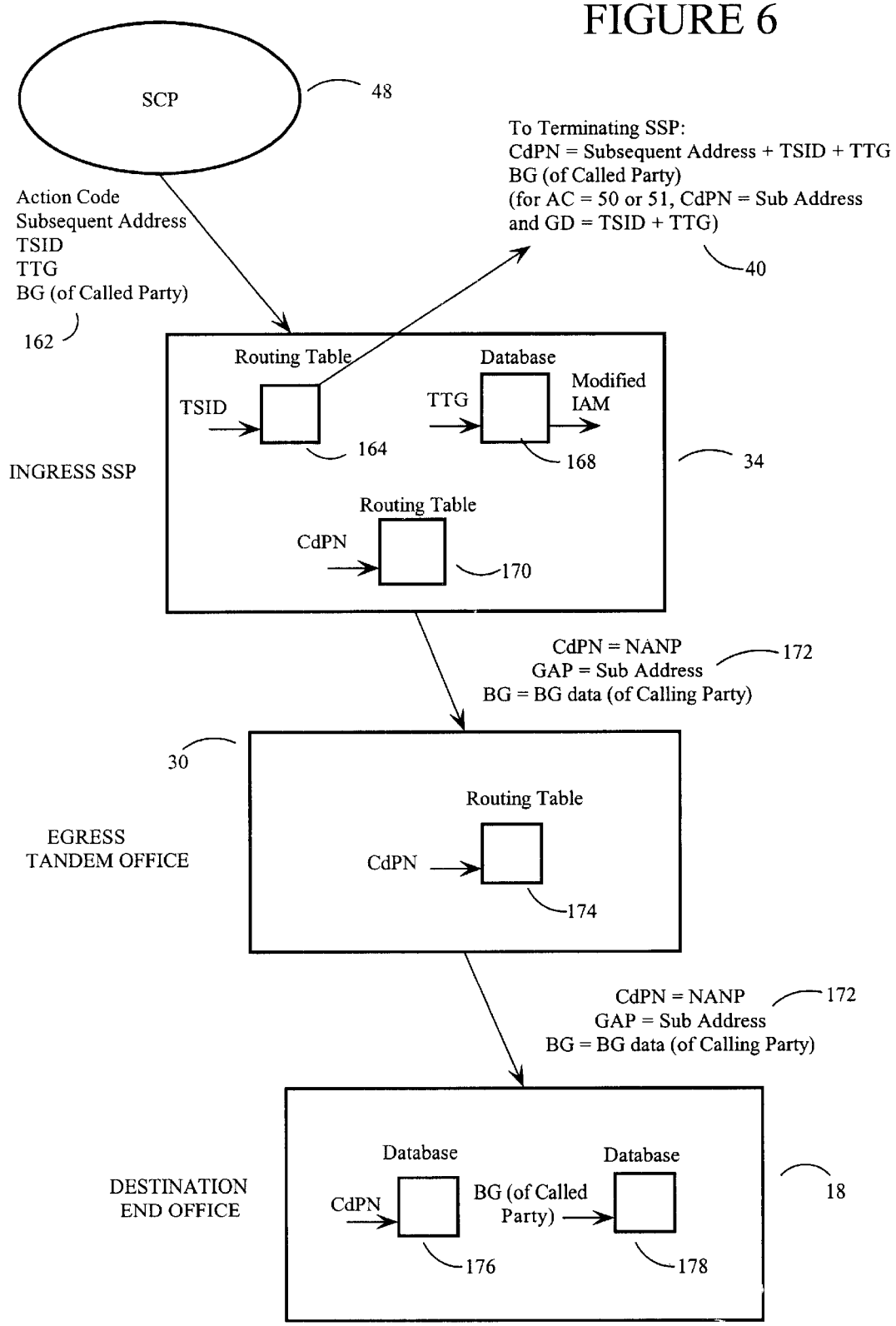
FIG. 6 is a flow diagram identifying the databases used within the signalling points, and the data transferred between the signalling points in the network, during egress from the Service Control Point, in an embodiment of the invention.

We refer now to FIG. 6, which outlines the Signalling Points and data that is transferred between those Signalling Points, on egress of an IAM from the SCP 48 to a Called Party 58. As indicated above, the invention is not restricted to the particular routing as described. One skilled in the art may apply the invention to different telecommunication network routings or configurations.

The Routing Message that is returned by the SCP 48 to the Ingress SSP contains the following data, identified as 162:
  AC=Action Codes 1, 2, 10, 11, 50 or 51
  7 or 10 digit subsequent address (AC=1, 2, 10, 11)=NXX-XXXX or NXX-XXX-XXXX
  Variable length subsequent address (AC=50, 51)= NXX . . . X
  Destination Switch ID=TSID
  Destination Trunk Group=TTG
  BG=Business Group Data (of the Called Party)

When the Routing Message is received by the Ingress SSP 34 it accesses a routing table 164, indexed with the TSID, to identify the Terminating SSP 40 and transmit the IAM to the Terminating SSP 40. If the Called Party 58 is served by the same SSP as the calling party 56, then the IAM will not be forwarded out of the Ingress SSP 34. If the Routing Message is sent to another SSP, the data will be sent in the following format, identified as 166:
  CdPN=Subsequent Address+TSID+TTG
  BG=Business Group Data (of the Called Party)
  (for AC=50 or 51, note that CdPN=Subsequent Address and GD=TSID+TTG)

When the IAM arrives at the Terminating SSP 40 identified by the TSID, a database 168 is accessed with TTG as an index to modify the IAM to be PSTN compatible. Each EO DAL, that is, each VPN customer site, will require an entry in this database to perform the following steps:
  1. copy the subsequent address from the SCP response or the IAM, into the GAP, and
  2. insert the North American Numbering Plan address identifying the destination end office, from the database, into the CdPN Parameter.

The Terminating SSP 40 then accesses a database or routing table 170 with the new CdPN, now containing a NANP number, and transmits the IAM out to the PSTN 44, in the format shown as 172:

| CdPN = | North American Numbering Plan Address |
|---|---|
| GAP = | Subsequent Address |
| BG = | Business Group Data (of the Called Party) |

At the PSTN 44, represented herein by a single TO 30, the IAM is routed on the basis of the CdPN. Being a NANP number, the IAM routes through the PSTN 44 using standard routing tables, such as 174, as it would a regular NANP call. No changes are made to the datafill of the IAM parameters during this routing.

When the IAM arrives at the Destination EO 18, it identifies the IAM as terminating at the Destination EO 18 by the existence of the CdPN in a database 176. At this point, a number of operations may be performed to direct the IAM to the Called Party. Such operations would include verifying that the BGid in the IAM matches the BGid of the Called Party 58, shown as database 178.

The invention has been described herein with reference to specific parameters and data fields. It would be understood by one skilled in the art that different parameters and data fields may be used, given consideration for the limitations that different fields would present. Furthermore, it would be understood by one skilled in the art, that the invention is equally applicable to different network arrangements and routings.

The term "internal database" is used to describe databases either internal to a switching office, or directly accessible from that switching office. This is intended to be distinct only from remote databases, such as a Data Access Point or Service Control Point. Clearly, the invention could be implemented in either manner. Furthermore, each switch is generally described as including a single database though clearly, the invention could be implemented by accessing multiple databases.

Although the present invention has been explained herein above by way of preferred embodiments thereof, it should be pointed out that any modifications to these preferred embodiments within the scope of the appended claims, are not deemed to change or alter the nature and scope of the present invention.

We claim:

1. A method of providing a Private Network on a Public Network for Customers having two or more sites, each said site having a unique customer site identification which includes a Switch Identification and a Trunk Group Identification representative of said customer's Dedicated Access Line, and being associated with an End Office Switch of said Public Network having at least one Service Switching Point adapted to route Private Network calls, said Service Switching Point responsive to an Initial Address Message originating from one of said customer sites and destined for another of said customer sites, comprising the steps of:
  embedding originating customer site identification and a Private Network Routing Code into a Called Party Number Parameter of an Initial Address Message at the originating End Office associated with the originating customer site;
  said originating customer site identification including an Originating Switch Identification and an Originating Trunk Group Identification representative of said originating customer's Dedicated Access Line;

routing said Initial Address Message to said Service Switching Point;

embedding a destination End Office identification and a destination customer site identification associated with said destination customer site into said Initial Address Message; and routing said Initial Address Message to the destination End Office Switch associated with said destination customer site.

2. A method as claimed in claim 1, wherein said step of embedding originating customer site identification and a Private Network Routing Code into an Initial Address Message at said originating End Office further comprises the steps of:

placing said originating customer site identification and said Private Network Routing Code into a Called Party Number Parameter;

placing an originating customer business group identification into a business group Parameter; and placing a dialled number into a General Address Parameter.

3. A method as claimed in claim 2, wherein said step of placing said originating customer site identification comprises the step of placing an originating Switch identification and an originating Trunk group identification representative of said originating Customer's Dedicated Access Line into said Called Party Number Parameter.

4. A method as claimed in claim 1, wherein said Public Network further comprises at least one Intermediate Switch, wherein said step of routing said Initial Address Message to said Service Switching Point, further comprises the steps of:

routing said Initial Address Message to one of said at least one Intermediate Switches on said Public Network via a shared Trunk group; and determining whether said Initial Address Message is destined for said Service Switching Point, and if so, routing said Initial Address Message to said Service Switching Point.

5. A method as claimed in claim 4, wherein said step of routing said Initial Address Message to said Service Switching Point, further comprises the steps of:

selecting a shared Trunk group by accessing an internal database indexed by said Called Party Number Parameter; and transmitting said Initial Address Message to said Service Switching Point via said shared Trunk group.

6. A method as claimed in claim 5, wherein said step of determining whether said Initial Address Message is destined for said Service Switching Point comprises the step of determining whether said Initial Address Message contains a Private Network Routing Code.

7. A method as claimed in claim 6, wherein said Public Network further comprises at least one Service Control Point accessible from a Service Switching Point, and after said step of routing said Initial Address Message to said Service Switching Point, performing the steps of:

determining whether said Initial Address Message requires routing instructions from said. Service Control Point, and if so:

preparing a VDAL (Virtual Dedicated Access Line) Query at said Service Switching Point; and transmitting said VDAL Query to said Service Control Point.

8. A method as claimed in claim 7, wherein said step of determining whether said Initial Address Message requires routing instructions from said Service Control Point further comprises detecting the presence of a business group Parameter and a Generic Address Parameter in said Initial Address Message.

9. A method as claimed in claim 1, wherein said Public Network comprises at least one Service Control Point and before said step of embedding said destination End Office identification and said destination customer site identification associated with said destination site into said Initial Address Message, performing the step of:

determining whether said originating customer and said destination customer are members of said same Virtual Private Network; and if so:

preparing a Response Message including a destination customer business group Parameter; and transmitting said Response Message to said Service Switching Point.

10. A method as claimed in claim 9 wherein said step of preparing a Response Message comprises the step of preparing a Response Message including said destination customer business group Parameter and said destination customer site identification.

11. A method as claimed in claim 10 wherein after said step of transmitting said Response Message to said Service Switching Point, performing the steps of:

determining whether said Service Switching Point is a Terminating Service Switching Point for said Initial Address Message, and if not, transmitting said Initial Address Message to said Terminating Service Switching Point; and modifying said Initial Address Message by:

identifying a destination End Office identification by accessing an internal database indexed by said destination customer site identification; and placing said destination End Office identification in said Called Party Number Parameter.

12. A method as claimed in claim 11 wherein said step of transmitting said Initial Address Message to said Terminating Service Switching Point comprises:

identifying said Terminating Service Switching Point by accessing an internal database indexed by said destination customer site identification;

placing said destination customer site identification in said Called Party Number Parameter;

placing said destination customer business group Parameter into said business group Parameter; and transmitting said Initial Address Message to said Terminating Service Switching Point.

13. A method as claimed in claim 1 wherein said step of routing said Initial Address Message to the destination End Office Switch associated with said destination site further comprises the steps of:

routing said Initial Address Message to the destination End Office Switch; and determining whether said Initial Address Message terminates at said destination End Office Switch by the presence of said destination End Office identification and said destination customer site identification in an internal database.

14. A system for providing a Private Network on a Public Network for customers having two or more sites, each said site having a unique customer site identification which includes a Switch Identification and a Trunk Group Identification representative of said customer's Dedicated Access Line, and being associated with an End Office Switch of said Public Network having at least one Service Switching Point accessible from said End Offices for processing of Initial Address Messages originating from one of said customer sites, said system comprising:

each said End Office Switch associated with said Private Network customer site being responsive to a call from a Private Network customer site by:

embedding an originating customer site identification and a Private Network Routing Code into a Called Party Number Parameter of an Initial Address Message at the originating End Office associated with the originating customer site;

said originating customer site identification including an Originating Switch Identification and an Originating Trunk Group Identification representative of said originating customer's Dedicated Access Line; and routing said Initial Address Message to said Service Switching Point;

said at least one Service Switching Point being adapted to route Private Network calls by being responsive to Private Network information embedded in said Initial Address Message by:

embedding a destination End Office identification and a destination customer site identification associated with said destination customer site into said Initial Address Message; and routing said Initial Address Message to the destination End Office Switch associated with said destination customer site.

15. A system as claimed in claim 14, wherein said End Office Switch associated with each said Private Network customer site being further operable to:

place said originating customer site identification and said Private Network Routing Code into a Called Party Number Parameter of said Initial Address Message;

place an originating customer business group identification into a Business Group Parameter of said Initial Address Message; and place a dialled number into a General Address Parameter of said Initial Address Message.

16. A system as claimed in claim 15, wherein said End Office Switch associated with each said site being operable to place an originating Switch identification and an originating Trunk group identification representative of said originating Customer's Dedicated Access Line into said Called Party Number Parameter.

17. A system as claimed in claim 14, said Public Network further comprising at least one Intermediate Switch accessible from said originating end office and having access to either one of said at least one Service Switching Points, or another of said at least one Intermediate Switches, each said Intermediate Switch being operable to:

receive said Initial Address Message from said originating end office, and be responsive to said Private Network Routing Code by routing said Initial Address Message to said Service Switching Point.

18. A system as claimed in claim 17, said Intermediate Switch further including an internal database for storing a plurality of Trunk Groups:

select a shared Trunk Group by accessing a internal database indexed by said Called Party Number; and route said Initial Address Message to said Service Switching Point via said shared Trunk Group.

19. A system as claimed in claim 17, said Intermediate Switch being operable to:

select a shared Private Network Trunk group by accessing a internal database indexed by said Called Party Number Parameter; and route said Initial Address Message to said Service Switching Point via said shared Private Network Trunk group.

20. A system as claimed in claim 18, wherein said Public Network further includes a Service Control Point containing information databases and being accessible from one of said at least one Service Switching Points, said system comprising:

said Service Control Point being operable to determine authorized members of a Private Network;

said at least one Service Switching Point being operable to determine whether said Initial Address Message requires routing instructions from said Service Control Point, and if so:

prepare a VDAL (Virtual Dedicated Access Line) Query at said Service Switching Point; and transmit said VDAL Query to said Service Control Point.

21. A system as claimed in claim 20, said Service Switching Point being responsive to the presence of a business group Parameter and a Generic Address Parameter in said Initial Address Message by requesting routing instructions from said Service Control Point.

22. A system as claimed in claim 14, wherein said Public Telephone System comprises at least one Service Control Point operable to determine whether said originating customer and said destination customer are members of a same said Private Network, and if so, prepare a Response Message including a destination customer Business Group Parameter and transmit said Response Message to said Service Switching Point.

23. A system as claimed in claim 22, said Service Control Point being operable to prepare a Response Message including said destination customer business group Parameter and said destination customer site identification.

24. A system as claimed in claim 23 wherein:

said Service Switching Point is further operable to determine whether said Service Switching Point is a Terminating Service Switching Point for said Initial Address Message, and if not, transmit said Initial Address Message to said Terminating Service Switching Point; and said Terminating Service Switching Point is further operable to modify said Initial Address Message by:

identifying a destination End Office identification by accessing an internal database indexed by said destination customer site identification; and placing said destination End Office identification in said Called Party Number Parameter.

25. A system as claimed in claim 24 wherein said Service Switching Point is further operable to:

identify said Terminating Service Switching Point by accessing an internal database indexed by said destination customer site identification;

place said destination customer site identification in said Called Party Number Parameter;

place said destination customer Business Group into said Business Group Parameter; and transmit said Initial Address Message to said Terminating Service Switching Point.

26. A system as claimed in claim 14 wherein said End Office Switch associated with said each said site being further operable to determine whether said Initial Address Message terminates at said End Office by the presence of said destination End Office identification and said destination customer site identification in an internal database.

* * * * *